United States Patent [19]

Chiang et al.

[11] Patent Number: 5,719,787
[45] Date of Patent: Feb. 17, 1998

[54] METHOD FOR ON-LINE DYNAMIC CONTINGENCY SCREENING OF ELECTRIC POWER SYSTEMS

[75] Inventors: Hsiao-Dong Chiang; Cheng-Shan Wang, both of Ithaca, N.Y.

[73] Assignee: Cornell Research Foundation, Inc., Ithaca, N.Y.

[21] Appl. No.: 648,277

[22] Filed: May 15, 1996

[51] Int. Cl.$^6$ .................................................... H02H 3/06
[52] U.S. Cl. ...................... 364/551.01; 364/492; 361/59; 361/62; 307/132 EA
[58] Field of Search .............................. 364/492, 483, 364/497, 578; 361/59, 62, 65, 78–80; 323/205; 324/522, 512; 327/379; 307/39, 132 EA

[56] References Cited

U.S. PATENT DOCUMENTS 5,483,462  1/1996  Chiang ..................... 364/492

OTHER PUBLICATIONS

Chiang et al, "Theoretical Foundation of the BCU method for Direct Stability Analysis of Network–Reduction power system models with small transfer conductances"; IEEE Transactions on circuits and systems, vol. 42, No.5, May 1995.

Chiang et al., "A BCU method for direct analysis of power system transient stability", IEEE Transactions on power systems, vol. 9, No. 3, Aug. 1994.

Chadalavada, V. et al., "An On–Line Contingency Filtering Scheme for Dynamic Security Assessment", 1996 IEEE/PES Winter Meeting, Jan. 21–25, 1996, Baltimore, Maryland.

Mokhtari, S., "Methods for Contingency Selection and Ranking for Dynamic Security Assessment", EPRI Final Report, RP3103-3, May 1994.

Primary Examiner—James P. Trammell
Assistant Examiner—Kamini S. Shah
Attorney, Agent, or Firm—Jones, Tullar & Cooper, P.C.

[57] ABSTRACT

A method for on-line dynamic contingency screening of electric power systems employs a sequence of contingency classifiers which are based on a method for finding the controlling unstable equilibrium point of the power system known as the boundary of stability region based controlling unstable equilibrium point method (BCU method). Dynamic security assessment of the power system is accomplished by evaluating the power system's response to a plurality of postulated disturbances known as contingencies. The BCU classifiers determine which of these contingencies are definitely stable, and require no further analysis. Other contingencies which are either classified as being unstable or undecided are then applied to a time-domain simulation program to determine if they are in fact unstable, and therefor warrant further action. Since the majority of the contingencies are determined by the BCU classifiers to be stable and need not be subjected to for the analysis, the computational speed of the dynamic security assessment process is greatly increased. Further, since the BCU classifiers are very accurate and never misclassify an unstable contingency as being stable, the accuracy of the dynamic security assessment is not compromised by the contingency screening process.

14 Claims, 5 Drawing Sheets

FIG. 1

METHOD FOR ON-LINE DYNAMIC CONTINGENCY SCREENING OF ELECTRIC POWER SYSTEMS

BACKGROUND OF THE INVENTION

The present invention relates in general to a method for on-line dynamic screening of contingencies in electric power systems which employs a contingency classification process that discriminates between stable and unstable contingencies. Since the majority of contingencies are stable and need not be processed further, the present invention substantially increases the computational speed of a dynamic security assessment employing the dynamic contingency screening process, and does so without any reduction in accuracy.

By nature, a power system is continually experiencing disturbances. These may be classified as: event disturbances or load disturbances. Event disturbances include generator outages, short circuits caused by lightning, sudden large load changes or a combination of such events. Load disturbances are the small random fluctuations in load demands which usually have no noticeable effect on the power system. Power systems are planned and operated to withstand the occurrence of these disturbances. Power system security analysis is employed to determine how a system will respond dynamically to postulated disturbances, known as contingencies. In dynamic security analysis, the transition of the system from the present operating condition to a new operating condition in response to a disturbance or contingency, and the fact that during the transient cascading outages will not be triggered, are of concern. In static security analysis, the transition to a new operating condition is assumed, and the analysis is focused on the satisfaction of both operating and engineering constraints (e.g., overloading, voltage, etc.). The present-day power system operating environment has contributed to the increasing importance of the problems associated with dynamic security assessment of power systems. To a large extent, this is due to the fact that most of the major power system breakdowns are caused by problems relating to system dynamic responses which mainly come from disturbances on the system.

The North American Electric Reliability Council defines security as the prevention of cascading outages when the bulk power supply is subjected to severe disturbances. The specific criteria which must be met are set by the individual reliability councils. Each council establishes the types of disturbances which the system must withstand without cascading outages. The following conditions, although conservative in nature, can ensure cascading outages will not occur: (i) when any of a specified set of disturbances occurs, the system will survive the ensuing transient and move into a steady-state condition, (ii) no bus voltage magnitudes during transients are outside their permissible ranges, (iii) in this new steady-state condition, no control devices, equipment or transmission lines are overloaded and no bus voltage magnitudes are outside their permissible ranges (say 5% of nominal). The first condition is related to the (transient) stability problem while the second one is related to the voltage-dip problem. Both of these conditions are concerned with the system's dynamic security, while the third condition is concerned with the system's static security.

It is currently a common practice to perform most of the dynamic security assessment (DSA) work off-line. This off-line work requires an extensive amount of efforts from the operation engineers who use detailed time-domain stability simulation programs or other techniques to determine the dynamic response of the power system to postulated disturbances or contingencies. For a typical large power system, thousands of nonlinear differential and algebraic equations must be solved, which takes tens of minutes of CPU time on a modern computer. This intensive computation requirement imposes severe constraints on the number of cases which can be studied. Moreover, the current power system operating environment motivates moving DSA from the off-line planning area into the on-line operating environment. This movement has resulted in part due to the recent federally mandated open access to the transmission grids which is motivating providers of transmission services to strive to achieve higher loadings of transmission networks and facilities than ever before thought possible. Another reason for this movement is that it is expected to result in significant financial benefits. Thus, there is always considerable incentive to find superior calculation methods for DSA.

The task of on-line DSA requires the ability to analyze hundreds of contingencies every 10 to 30 minutes using on-line data. It is still a very challenging task because of the computational speed requirements for on-line stability analysis of creditable contingencies that the operators specify. Hence, it is very desirable to be able to significantly reduce the computational burden required for on-line DSA. Contingency screening is therefore a fundamental function for a dynamic security assessment system. The objective of contingency screening is to identify contingencies which are definitely stable and therefore do not require further stability analysis. The strategy of using an effective scheme to screen out a large number of stable contingencies and applying detailed simulation programs only to potentially unstable contingencies is widely accepted. However, due to the complexity of power system dynamical behaviors and the time-consuming nature of traditional time-domain stability simulation programs, effective dynamic contingency screening for on-line DSA has still been lacking until now.

During the past few years, the growing developments in the direct methods foster the development of schemes for fast dynamic contingency screening. The most prominent feature of the direct methods for transient stability analysis is that they can determine system stability in a fast fashion. In addition, the energy margin in the direct methods offers a good indicator for contingency ranking. A consensus seems to have emerged that among several existing direct methods, the controlling unstable equilibrium point (u.e.p.) method is the most viable for direct stability analysis of practical power systems. The success of the controlling u.e.p. method, however, hinges upon its ability to find the (correct) controlling u.e.p. Thus, there is a strong need for a reliable and systematic method to find the controlling u.e.p.

Recently, a systematic method, called boundary of stability region based controlling unstable equilibrium point method (BCU method), to find the controlling u.e.p. was developed. The method was also given other names such as the exit point method and the hybrid method, and is disclosed in U.S. Pat. No. 5,483,462 to Chiang. The BCU method has also been evaluated in a large-scale power system and compared favorably with other methods in terms of its reliability and the required computational efforts. The BCU method has been applied to the fast derivation of power transfer limits and demonstrated its capability for on-line transient stability assessments when applied to real power rescheduling to increase dynamic security.

The fundamental ideas behind the BCU method can be explained in the following. Given a power system stability model (which admits an energy function), the BCU method computes the controlling u.e.p. of the original model via the controlling u.e.p. of a dimension-reduction system whose controlling u.e.p. is easier to compute. In doing so, the BCU method first explores special properties of the underlying original model with the aim of defining an artificial, dimension-reduction system such that some static as well as dynamic properties are met.

The BCU method then finds the controlling u.e.p. of the dimension-reduction system by exploring the special structure of the stability boundary and the energy function of the dimension-reduction system. Third, it relates to controlling the u.e.p. of the artificial system to the controlling u.e.p. of the original system.

Until now, no successful attempt has been made to employ the concepts of the BCU method in a dynamic contingency screening process. Such a process would be very desirable for it would provide superior performance in the classification of stable and unstable contingencies as compared to prior art contingency screening processes.

SUMMARY OF THE INVENTION

To fulfill the foregoing need, the present invention provides a novel method for on-line dynamic contingency screening which employs the fundamental concepts of the BCU method. More partiuclarly, the present invention provides a method for on-line dynamic security assessments (DSA) which employs an architecture comprised of two major components: a dynamic contingency screening program made up of a sequence of BCU classifiers and an on-line transient stability (time-domain) simulation program. When a new cycle of DSA is warranted as a result of a significant change in the power system's state, a list of credible contingencies, along with information from a state estimator and topological analysis, are applied to the BCU classifiers whose basic function is to screen out contingencies which are definitely stable.

The design objective of the BCU classifiers is to ensure that the requirements of the computational speed and accuracy for on-line contingency screening are met. Regarding accuracy, the criterion is that a contingency must be stable, either first-swing or multi-swing, if it is classified by the BCU classifiers to be stable. However, a contingency could be either stable or unstable, either first-swing or multi-swing, if it is classified by the BCU classifiers to be unstable. Classifying a stable contingency, either first-swing or multi-swing, to be unstable, is the only scenario in which the BCU classifiers give conservative classifications. The contingencies which are either undecided or classified to be unstable by the BCU classifiers are then applied to the detailed time-domain simulation programs for further analysis.

Preferably, the contingency screening process employs a sequence of five BCU classifiers to screen out the stable contingencies. The first classifier is known as the post-fault equilibrium point classifier, and is designed to screen out those potentially highly unstable, harmful contingencies which are likely to cause instability of the post-fault system, or the misclassification of the BCU classifiers that follow this first classifier. The basis for this classifier is the insufficiency of the size of a post-fault stability region, or in the extreme case, the non-existence of the post-fault stable equilibrium point (s.e.p.). To identify those contingencies which have the convergence problem of computing post-fault stable equilibrium points, the first BCU classifier employs two indices, the first being the maximum number of iteration in computing the post-fault s.e.p., and the second being the maximum angle difference at the computed s.e.p. If the actual number in the iterative process for computing the post-fault stable equilibrium point is larger than the maximum number of iteration, or the angle difference at the computed point is larger than the maximum angle difference, then the contingency is classified to be one of a group of special uncertain cases which, from experimental analysis, are often unstable, and thus are classified as unstable cases.

The second of the five BCU classifiers comprises a first exit point classifier which is intended to screen out mild contingency cases. These cases are highly stable, and do not require further stability analysis. Screening out of these mild contingencies can greatly improve the efficiency of the dynamic contingency screening process. The exit point, which is the point at which the projected fault-on trajectory crosses the Potential Energy Boundary Surface (PEBS), is detected by a line search along a ray emanating from the stable equilibrium point. A contingency is said to have an exit point problem if the corresponding PEBS crossing point cannot be found in a given time. It has been found that a contingency is usually mild when the increase in potential energy along the fault-on trajectory is relatively small. Thus, if the PEBS crossing point cannot be found in the given time interval, and if the potential energy difference is greater than zero but less than a threshold value, then the second classifier determines that this contingency is very mild with no further analysis being necessary.

The third BCU classifier comprises a second exit point classifier which is designed to detect contingencies that will cause a minimum gradient point problem which usually damages the effectiveness and accuracy of the BCU method. A key step in the BCU method is to integrate the reduced system starting from the exit point to find the local minimum point which will be used as an initial guess for the controlling unstable equilibrium point (u.e.p.). The minimum gradient point problem may arise during integration of the reduced system, and occurs either when there is no minimum gradient point in the trajectory of the reduced system, or when the minimum gradient point lies close to another u.e.p. such that a wrong controlling u.e.p. is obtained. This classifier thus detects contingencies that will cause the minimum gradient point problem, and sends them to the time-domain simulation program for further analysis.

The fourth BCU classifier is known as the minimum gradient point classifier, and is intended to filter out stable cases based on some dynamic information at the minimum gradient point. Numerical experience indicates that the energy value at the minimum gradient point can sometimes be used to approximate the energy value at the controlling u.e.p. This classifier uses two indices for classification, both of which rely on energy measurements at the minimum gradient point.

Finally, the fifth classifier is known as the controlling unstable equilibrium point classifier which classifies each contingency as being either definitely stable, or potentially unstable. Two indices are employed by this classifier, the first one of which is used to detect the convergency problem of computing the controlling u.e.p. If this index detects that the maximum number of iteration in computing the controlling u.e.p. starting from the minimum gradient point exceeds a set maximum, then the corresponding contingency is viewed as having a numerical divergency problem, and is classified to be unstable. The second index makes use of the energy value at the controlling u.e.p. It can be proved that if the energy value at the fault clearing time is less than the energy value at the controlling u.e.p., the corresponding contingency is determined by this classifier to be stable; otherwise it is determined to be potentially unstable.

In practice, the screening of the contingencies by the BCU classifiers results in a majority (e.g., two-thirds) of the contingencies being classified as stable. The stable contingencies therefore need not be applied to the detailed time-domain simulation programs for further analysis. This results in the dynamic security assessment process being completed hundreds of times faster than a conventional process that does not employ the BCU method based contingency screening. The reason for this is that the contingencies which are classified by the BCU classifiers as being stable typically require much more computational effort and time for analysis by the time-domain simulation program. Also, the specific sequence of the five BCU classifiers further insures the most time and computational effort efficient screening of the stable contingencies. At the same time, accuracy of the results is insured since the BCU classifiers are designed in such a manner that a contingency will not be classified as stable unless it is in fact stable.

BRIEF DESCRIPTION OF THE DRAWINGS

The features and advantages of the present invention will become apparent from the following detailed description of a preferred embodiment thereof, taken in conjunction with the accompanying drawings in which.

DETAILED DESCRIPTION OF THE PREFERRED EMBODIMENT

Figure 1:
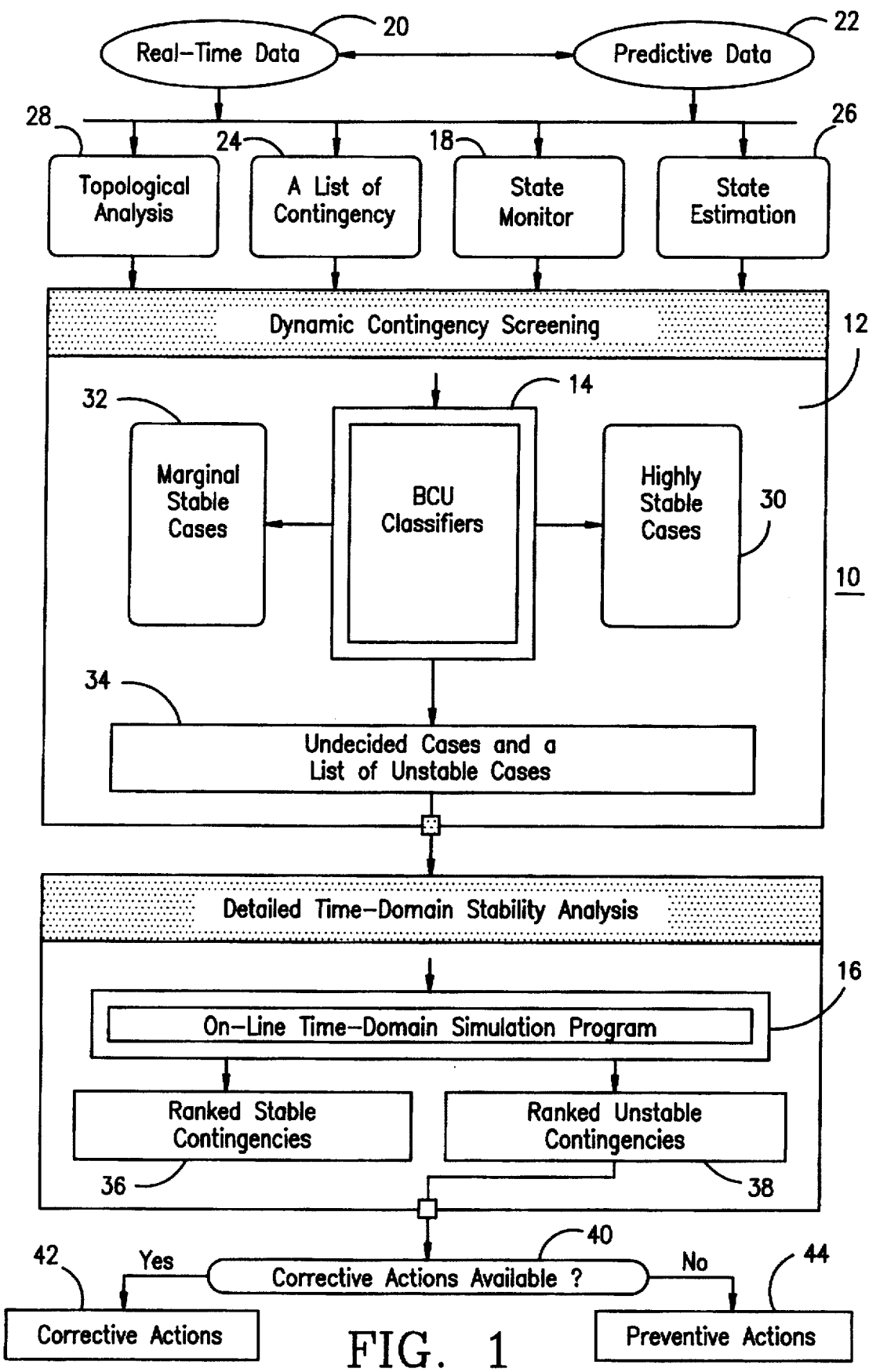
FIG. 1 is a diagrammatic illustration of an architecture employed by a preferred embodiment of the present invention for on-line dynamic security assessments.

Turning now to a more detailed consideration of a preferred embodiment of the present invention, FIG. 1 illustrates an architecture 10 for on-line dynamic security assessments. The architecture 10 is comprised of two major elements: a dynamic contingency screening program 12 made up of a plurality of BCU classifiers 14, and an on-line time-domain simulation program 16. The BCU classifiers 14 are the key to the method of the present invention, and are discussed in greater detail below in conjunction with FIG. 3, while the on-line time-domain simulation program 16 can be any known simulation program, such as for example, the Electric Power Research Institute's (EPRI's) Extended Transient and Midterm Stability Program (ETMSP).

A state monitor 18 receives real-time data 20 and predictive data 22 from a power system (not shown) on which a dynamic security assessment is to be made. The state monitor 18 employs the power system data to determine, based on the system's present state, the need to initiate a new cycle of dynamic security assessment. If the state monitor 18 detects that there has been significant change in the power system's condition, the state monitor 18 initiates the DSA by initiating the dynamic contingency screening program 12.

Once the dynamic contingency screening program 12 has been initiated by the state monitor 18, a list of credible contingencies 24, information from a state estimator 26 and information from a topological analysis program 28 are applied to the BCU classifiers 14 which employ this information to screen out contingencies that are definitely stable, and do not warrant further processing. The list of credible contingencies 24 comprises thousands of possible faults which may occur in the power system; while the state estimator 26 preferably is a software package which estimates the current state, i.e., voltage magnitude and phase angle, at every bus in the power system; and, the topological analysis program 28 defines the network topology of the power system (i.e., defines how all of the system's elements, such as circuit breakers, are connected).

To insure that the requirements of computational speed and accuracy for on-line contingency screening are met, each of the BCU classifiers 14 is designed so that any contingency which is classified by them to be stable, is in fact stable, either first-swing or multi-swing. The BCU classifiers 14 result in separation of the various contingencies into a first group 30 of highly stable cases, a second group 32 of marginally stable cases and a third group 34 of undecided cases and unstable cases. Only this third group 34 of cases is then sent to the on-line time-domain simulation program 16 for further analysis since the first and second groups 30 and 32 of stable cases need not be analyzed further. The simulation program 16 is then employed to separate the third group of cases 34 into a fourth group 36 of ranked stable contingencies and a fifth group 38 of ranked unstable contingencies. As a final step, the fifth group 38 of ranked unstable contingencies is screened at 40 to determine if corrective actions are available. If so, these corrective actions are implemented at 42, while preventative actions are implemented at 44 if corrective actions are not available.

The BCU classifiers 14 are derived from the BCU method disclosed in Applicant Hsiao-Dong Chiang's previous patent, U.S. Pat. No. 5,483,462, which is hereby incorporated by reference. The following is a discussion of this network-preserving BCU method from which the BCU classifiers 14 are derived. All existing network-preserving models can be written as a set of general differential-algebraic equations of the following compact form:

$$0 = -\frac{\partial}{\partial u} U(u,w,x,y) + g_1(u,w,x,y) \tag{1}$$

$$0 = -\frac{\partial}{\partial w} U((u,w,x,y) + g_2(u,w,x,y)$$

$$T\dot{x} = -\frac{\partial}{\partial x} U(u,w,x,y) + g_3(u,w,x,y)$$

$$\dot{y} = z$$

$$M\dot{z} = -Dz - \frac{\partial}{\partial y} U(u,w,x,y) + g_4(u,w,x,y)$$

where $u \in T^k$ and $w \in R^l$ are instantaneous variables while $x \in R^n$, $y \in T^n$ and $z \in R^n$ are state variables. T is a positive definitive matrix and M and D are diagonal positive definite matrices. $g_1(u,w,x,y)$, $g_2(u,w,x,y)$, $g_3(u,w,x,y)$ and $g_4(u,w,x,y)$ is the vector field representing the effects of the transfer conductance in the network Y-bus matrix.

To develop a BCU method for the generic network-preserving model (1), the associated artificial dimensional-reduction system needs to be defined first. The following differential-algebraic equation (DAE) system is chosen as the dimensional-reduction system:

$$0 = -\frac{\partial}{\partial u} U(u,w,x,y) + g_1(u,w,x,y) \quad (2)$$

$$0 = -\frac{\partial}{\partial w} U((u,w,x,y) + g_2(u,w,x,y)$$

$$\dot{T}x = -\frac{\partial}{\partial x} U(u,w,x,y) + g_3(u,w,x,y)$$

$$\dot{y} = -\frac{\partial}{\partial y} U(u,w,x,y) + g_4(u,w,x,y)$$

The static as well as dynamic relationship between the dimension reduction DAE system (2) and the original DAE system can be established as described in the following.

Theorem 3-1: (Static Relationship)

Let $(u_s, w_s, x_s, y_s)$ be a stable equilibrium point of system (2). If zero is a regular value of $$\frac{\partial^4 U(u,w,x,y)}{\partial u \partial w \partial x \partial y},$$

then there exists a positive number $\epsilon > 0$ such that the transfer conductance of system (2) satisfies $G_{ij} < \epsilon$, and $(\hat{u}, \hat{w}, \hat{x}, \hat{y})$ is a type-k equilibrium point of system (2) if and only if $(\hat{u}, \hat{w}, \hat{x}, \hat{y})$ is a type-k equilibrium point of the system (1)

Theorem 3-2: (Dynamic Relationship)

Let $(u_s, w_s, x_s, y_s)$ be a stable equilibrium point of system (2). If zero is a regular value of $$\frac{\partial^4 U(u,w,x,y)}{\partial u \partial w \partial x \partial y}.$$

If there exists a positive number $\epsilon > 0$ such that the transfer conductance of system (2) satisfies $G_{ij} < \epsilon$ and the intersections of the stable and unstable manifolds of the equilibrium points on the stability boundary $\partial A(u_s, w_s, x_s, y_s, 0)$ of the parameterized system $d(\lambda)$ satisfy the transversality condition for $\lambda \in [0,1]$, then (i) The equilibrium point $(u_i, w_i, x_i, y_i, 0)$ is on the stability boundary $\partial A(u_s, w_s, x_s, y_s, 0)$ of system (2) if and only if the equilibrium point $(u_i, w_i, x_i, y_i, 0)$ is on the stability boundary $\partial A(u_s, w_s, x_s, y_s, 0)$ of system (1);

(ii) $\partial A(u_s, w_s, x_s, y_s, 0)|_{d(0)} = UW_d^{s(0)}(u_i, w_i, x_i, y_i, 0)$ (3)
$\partial A(u_s, w_s, x_s, y_s, 0)|_{d(1)} = UW_d^{s(0)}(u_i, w_i, x_i, y_i, 0)$ (4)

Theorem 3-1 and Theorem 3-2 provide the theoretical basis for finding the controlling u.e.p. of the original network-preserving model via the controlling u.e.p. of the artificial, dimension-reduction system. Based on the above theoretical developments, a numerical BCU method for the network-preserving model is presented in the following:

Step 1: (computing the exit point) From the (sustained) fault-on trajectory $(u(t), w(t), x(t), y(t), z(t))$ of the DAE system, detect the exit point $(u^*, w^*, x^*y^*)$ at which the projected trajectory $(u(t), w(t), x(t), y(t))$ reaches the first local maximum of the numerical potential energy function $U_{num}(\ldots)$.

Step 2: (computing the minimum gradient point) Use the point $(u^*, w^*, x^*y^*)$ as the initial condition and integrate the post-fault, dimension-reduction system (2) to the (first) local minimum of $$\left\| \frac{\partial}{\partial u} U(u,w,x,y) + g_1(u,w,x,y) \right\| + \left\| \frac{\partial}{\partial w} U(u,w,x,y) + g_2(u,w,x,y) \right\| + \left\| \frac{\partial}{\partial x} U(u,w,x,y) + g_3(u,w,x,y) \right\| + \left\| \frac{\partial}{\partial y} U(u,w,x,y) = g_4(u,w,x,y) \right\|.$$

Let the local minimum be $(u_o^*, w_o^*, x_o^*, y_o^*)$

Step 3: Use the point $(u_o^*, w_o^*, x_o^*, y_o^*)$ as the initial guess and solve the following set of nonlinear algebraic equations $$\left\| \frac{\partial}{\partial u} U(u,w,x,y) + g_1(u,w,x,y) \right\| + \left\| \frac{\partial}{\partial w} U(u,w,x,y) + g_2(u,w,x,y) \right\| + \left\| \frac{\partial}{\partial x} U(u,w,x,y) + g_3(u,w,x,y) \right\| + \left\| \frac{\partial}{\partial y} U(u,w,x,y) + g_2(u,w,x,y) \right\| = 0$$

Let the solution be $(u_c^{*o}, w_c^{*o}, x_c^{*o}, y_c^{*o})$.

Step 4: The controlling u.e.p. with respect to the fault-on trajectory $(u(t), w(t), x(t), y(t), z(t))$ of the DAE system is $(u_c^{*o}, w_c^{*o}, x_c^{*o}, y_c^{*o}, 0)$.

Steps 1 to 3 find the controlling u.e.p. of the artificial, dimension-reduction system and Step 4 relates the controlling u.e.p. of the dimension-reduction system to the controlling u.e.p. of the original system. In Step 2, the integration of the post-fault dimension-reduction system can be replaced by the integration of the boundary-layer system of the post-fault dimension-reduction system to accelerate the computational procedure.

Figure 2:
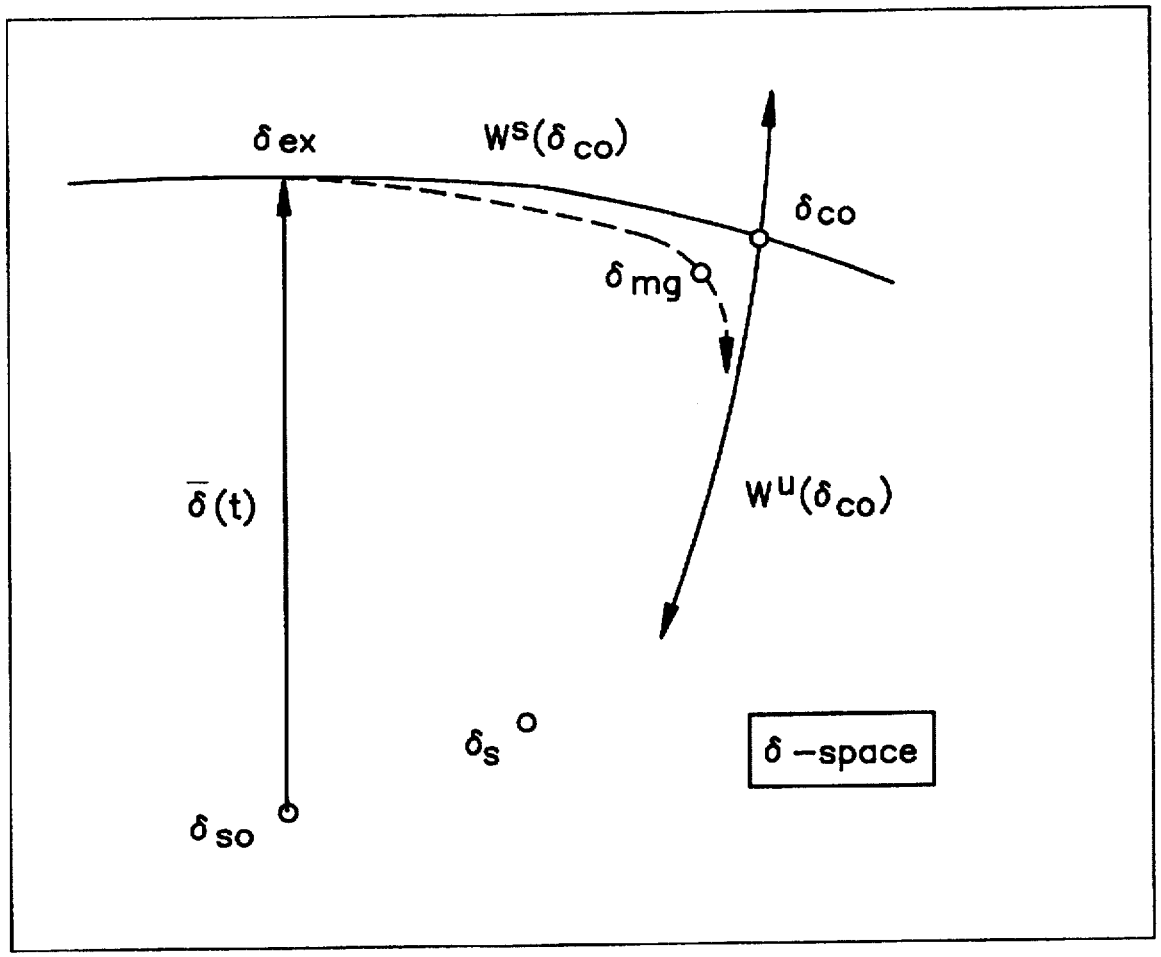
FIG. 2 is a graphical depiction of a number of points in angle space which are employed to compute the controlling u.e.p. using the BCU method.

The accuracy of stability assessment provided by direct methods depends largely on the determination of the controlling u.e.p. As discussed previously, the BCU method is a systematic method to compute the controlling u.e.p., which is schematically shown in FIG. 2, where the following notations are used:

$\delta_{so}$—The pre-fault stable equilibrium point of the reduced system;

$\delta_s$—The post-fault stable equilibrium point of the reduced system;

$\delta_{ex}$—The exit point of projected fault-on trajectory;

$\delta_{mg}$—The first minimum gradient point;

$\delta_{co}$—The controlling u.e.p. of the reduced system.

Figure 3:
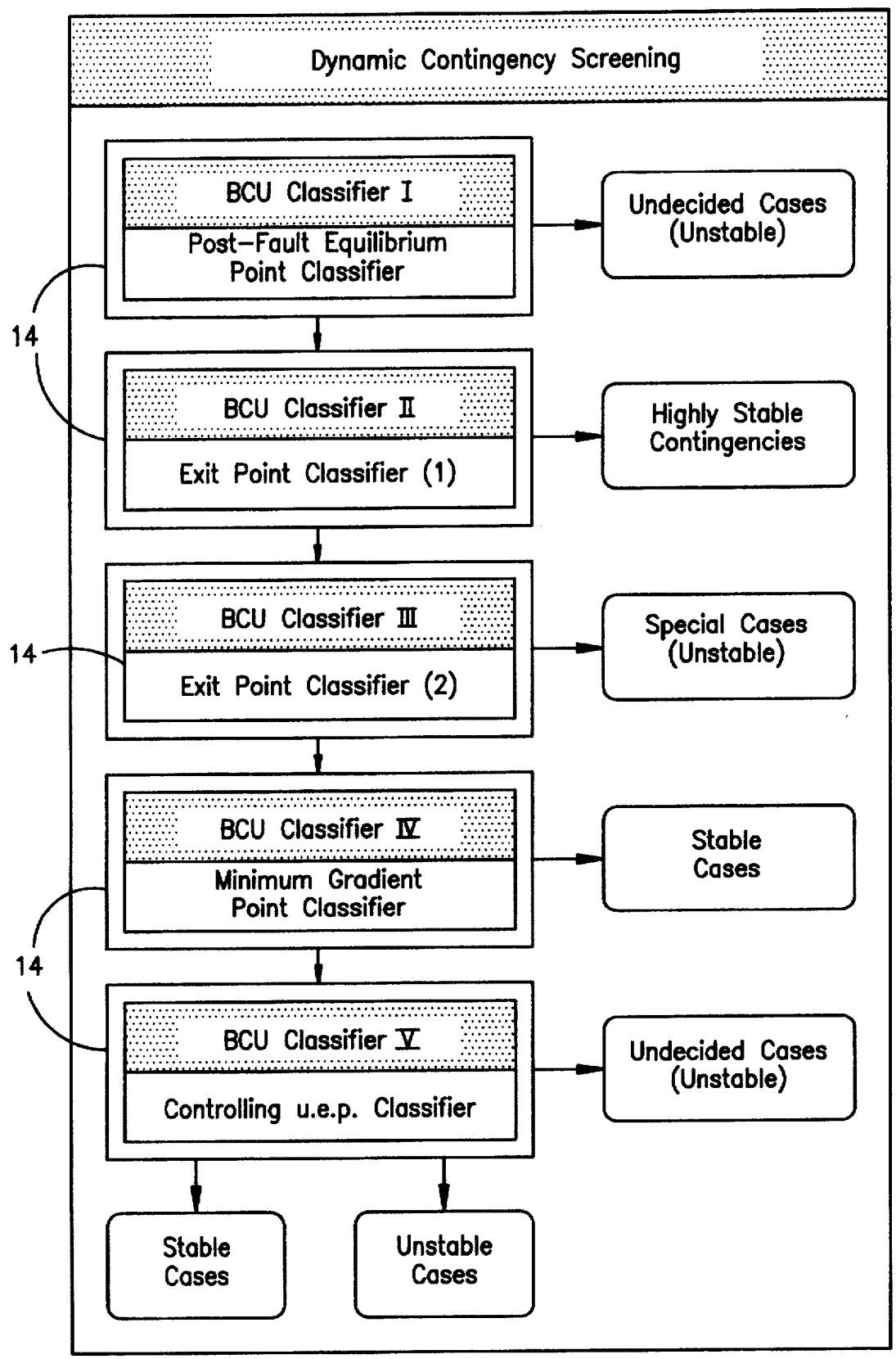
FIG. 3 is a diagrammatic illustration of a sequence of BCU classifiers that are based on the BCU method, and are employed in the preferred embodiment of the present invention for on-line dynamic contingency screening.

A majority of computation efforts required in the BCU method is the determination of the three state points: the exit point, the minimum gradient point and the controlling u.e.p. Useful stability information can be derived from these three points to develop effective schemes for dynamic contingency screening. The sequence of BCU classifiers 14 is next developed, based on the BCU method, for on-line dynamic contingency screening. The BCU classifiers 14 are composed of a sequence of five dynamic contingency classifiers labelled I-V as illustrated in FIG. 3. These five dynamic contingency classifiers are mainly based on the three steps of the BCU method and the information of the post-fault stable equilibrium point.

Given a list of credible contingencies to the BCU classifiers 14, the first classifier I serves to screen out those contingencies with the convergence problem of computing post-fault stable equilibrium points. The second and third classifiers II and III, based on step one of the BCU method, are the fastest ones. They use the energy value at the exit point on the stability boundary of the dimension-reduction system as an approximation for the critical energy. The second classifier II is designed to drop out those contingencies which are highly stable, while the third one III is designed to screen out those contingencies which may cause computation difficulties in the BCU method. The fourth classifier IV uses the energy value at the (first) local minimum gradient point, which is step two of the BCU method, to drop out definitely stable contingencies. The fifth and most accurate classifier V uses the energy value at the controlling u.e.p. as the critical energy, which is the third step of the BCU method, to classify every contingency left over from the previous classifiers into two classes: stable cases and unstable cases.

Contingencies which are classified to be definitely stable at each classifier are dropped out from further analysis. It is due to this kind of definitely stable contingencies that considerable speed-up can be achieved for dynamic contingency analysis. Contingencies which are either undecided or identified to be unstable are then sent to the time-domain transient stability simulation program 16 for further stability analysis. Note that the conservative nature of the BCU method guarantees that the results obtained from the five dynamic contingency classifiers I-V are also conservative (i.e., no unstable cases are mis-classified as being stable). This is very important to insure that the accuracy of the method is not compromised.

Next, numerical issues of each BCU classifier, the design of each classifier and the basis behind it are presented.

Classifier I: (Post-Fault Equilibrium Point Classifier)

This classifier is designed to screen out those potentially highly unstable (i.e., harmful) contingencies which are likely to cause instability of the post-fault system, or the misclassification of the BCU classifiers that follow classifier I. The basis for this classifier is the insufficiency of the size of the post-fault stability region, or in the extreme case, the non-existence of post-fault stable equilibrium point. This is explained as follows.

In order for direct methods to be applicable, the following three conditions need to be satisfied: (i) the post-fault equilibrium point is asymptotically stable, (ii) the pre-fault stable equilibrium point, $\delta_{so}$, and the post-fault equilibrium point, $\delta_s$, are close to each other (so that using a nonlinear algebraic solver, such as the Newton method, with $\delta_{so}$ as the initial guess will lead to $\delta_s$) and, (iii) the pre-fault stable equilibrium point, $\delta_{so}$, lies inside the stability region of the post-fault equilibrium point, $\delta_s$. If the pre-fault s.e.p. lies outside the stability region of the post-fault stable equilibrium point (s.e.p.), $\delta_s$, it is very likely that the post-fault trajectory will not approach $\delta_s$ and is hence potentially unstable. It is possible that some contingencies in practical power systems would violate these conditions in a practical power system. Such contingencies are said to have the convergence problem of computing the stable equilibrium point. These kinds of contingencies, which are not suitable for direct methods to analyze, are more appropriately analyzed by the time-domain approach.

In this classifier, two indices are designed to identify the contingencies which have the convergence problem of computing post-fault stable equilibrium points:

$I_{smax}$: The maximum number of iteration in computing the (post-fault) stable equilibrium point.

$\delta_{smax}$: The maximum angle difference at the computed stable equilibrium point.

The first index is used to determine whether the contingency has the convergence problem of computing post-fault s.e.p. The second index is used to test whether the computed point is an s.e.p. or is just a u.e.p. If the actual number in the iterative process for computing the post-fault s.e.p. is larger than $I_{smax}$, or the angle difference at the computed point is larger than $\delta_{smax}$, then the contingency is classified to be a special uncertain case. A numerical experiment indicates that such contingencies are often unstable and so they are classified as unstable cases. Since it is possible that the difference of all angles at a u.e.p. is less than 90 degrees, an angle slightly less than 90 degrees can be used as a threshold value for $\delta_{smax}$ to guarantee conservative results.

Classifier II (Exit Point Classifier(1))

This classifier is intended to screen out mild contingency cases. A contingency case is said to be mild if it is highly stable. Further stability analysis is unnecessary for mild contingencies, and screening them out can greatly improve the efficiency of the process for dynamic contingency screening.

In the BCU method, the exit point, i.e. the point at which the projected fault-on trajectory crosses the Potential Energy Boundary Surface (PEBS), is detected by a line search along a ray emanating from the s.e.p., $\delta_s$, or in the direction of the fault-on trajectory itself (by using the difference between successive points rather than the difference between the latest point and s.e.p., $\delta_s$). A contingency is said to have an exit point problem if the corresponding PEBS crossing point can not be found in a given time, say $T_{exit}$. It has been found that a contingency is usually mild when the increase in potential energy along the fault-on trajectory of such a contingency is relatively small. This important feature for mild contingencies manifests itself in a large number of numerical tests on several power system data sets.

Two indices are designed for this classifier. They are:

$T_{exit}$: The maximum time interval of simulation for fault-on system.

$V_{pe1}(>0)$: The potential energy difference between the pre-fault equilibrium point and that at $t=T_{exit}$, i.e. $V_p(\delta(T_{exit}))$.

If the PEBS crossing point can not be found in the time interval $[0,T_{exit}]$, and if the potential energy difference $V_p(\delta(T_{exit}))$ is greater than zero but less than the threshold value $V_{pe1}$, then the contingency case is very mild and no further analysis is needed.

Classifier III (Exit Point Classifier (2))

A key step in the BCU method is to integrate the reduced system starting from the exit point, $S_{ex}$, to find the local minimum point $\delta_{mg}$, which will be used as an initial guess for the controlling u.e.p. A problem, called the minimum gradient point problem, may arise during integration of the reduced system. The problem is described by the following: (i) there is no minimum gradient point in the trajectory of the reduced system, or (ii) the minimum gradient point lies close to another u.e.p. such that a wrong controlling u.e.p. is obtained when solving $\Sigma_i^{n=1}\|f_i(\delta)\|=0$. The minimum gradient point problem usually damages the effectiveness and accuracy of the BCU method. This classifier is designed to detect the contingencies that will cause the minimum gradient point problem. Furthermore, for the purpose of reducing computational efforts, the classifier should be able to determine whether the problem exists before integrating the reduced system. To this end, the following index is proposed for this classifier:

$V_{e2}$: The potential energy difference between the pre-fault state and exit point.

When the potential energy at the exit point $V_p(\delta_{ex})$ is greater than the threshold value for $V_{e2}$, the contingency is considered to have the minimum gradient point problem and is sent to the time-domain simulation program for further analysis.

Classifier IV (Minimum Gradient Point Classifier)

This classifier is intended to "filter" out stable cases based on some dynamic information at the minimum gradient point. Numerical experience indicates that the energy value at the minimum gradient point can sometimes be used to approximate the energy value at the controlling u.e.p. This classifier uses two indices for classification. The first one is the following index, an approximate normalized energy margin:

$$\Delta V_{mg} = (V_{mg} - V_k)/V_k$$

where $V_k$ is the total kinetic energy gained by the system during the fault-on period and $V_{mg}$ is the difference between the potential energy at fault clearing time and that of the minimum gradient point $\delta_{mg}$. Given a threshold for $\Delta V_{mg}$, say $V_{cmg}$, if $\Delta V_{mg} > V_{cmg}$, the corresponding contingency is considered to be stable.

It can be proved theoretically that the potential energy at the minimum gradient point should be smaller than that at the exit point if the transfer conductance in a power system is sufficiently small. It is possible that the potential energy at the minimum gradient point may be a little higher than that at the exit point for some practical contingencies. When the energy at the minimum gradient point is very high, incorrect stability assessments may be obtained when using the energy at the minimum gradient point to approximate that at the controlling u.e.p. It is therefore necessary to design another index to detect such unusual contingencies which have very high energy at the minimum gradient point. Hence, it is proposed to use the index similar to that used in exit point classifier II, i.e. the potential energy difference between the pre-fault state and the minimum gradient point. Regarding the selection of the threshold value for this index, it should be no greater than that used in the classifier II.

Classifier V (Controlling u.e.p. Classifier)

This classifier classifies each contingency into (definitely) stable, and (potentially) unstable. There are two indices developed for this classifier. The first one is used to detect the convergency problem of computing the controlling u.e.p. This index uses the maximum number of iteration, say $I_{umax}$, in computing the controlling u.e.p., starting from the minimum gradient point, to detect such a problem. If the required number of iteration is more than $I_{umax}$, then the corresponding contingency is viewed as having a numerical divergency problem and is classified to be unstable. The second index makes use of the energy value at the controlling u.e.p. It can be proved that if the energy value at the fault clearing time is less than that at the controlling u.e.p., the corresponding contingency is (definitely) stable, otherwise it is (potentially) unstable. Based on this theoretical result, the second index is the energy value at the fault clearing time and the threshold value for the second index is the energy value at the controlling u.e.p.

To summarize the design of the five BCU classifiers, their objective is to ensure that the requirements of the computational speed and accuracy for on-line contingency screening are met. A contingency must be (first-swing or multi-swing) stable if it is classified by the BCU classifiers to be stable. A contingency could be either stable or unstable, either first-swing or multi-swing, if it is classified by the BCU classifiers to be unstable. However, just like other classifiers, the selections of the threshold values for the above five classifiers are system dependent. However, experience has shown that, given a system, the determination of a clear threshold value can be easily achieved by some off-line calculations over a range of operating conditions. Moreover, the performance of the five classifiers is not sensitive to the selection of threshold values. In other words, the selection of the threshold values for the various classifiers does not affect the accuracy of the contingency screening process so that coarse adjustment of the threshold values is all that is necessary for each of the classifiers to function properly.

The method of the present invention for on-line dynamic security assessments using the BCU classifiers has been evaluated on data from two power systems: a 50-generator, 145-bus power system which is an IEEE test system and a 202-generator, 1293-bus power system. The types of faults considered in the evaluation were three-phase faults with fault locations at both generator and load buses. Both severe and mild faults were considered. All faults were assumed to have been cleared after 0.1s.

For the 50-generator system, the method of the present invention was evaluated on the following two loading conditions subject to 844 contingencies associated with each loading condition.

(i) The base case with a 700 MW load on each generator at buses 93 and 110, respectively.

(ii) The stressed case with a 1580 WM load on each generator at buses 93 and 110, respectively.

Figure 4:
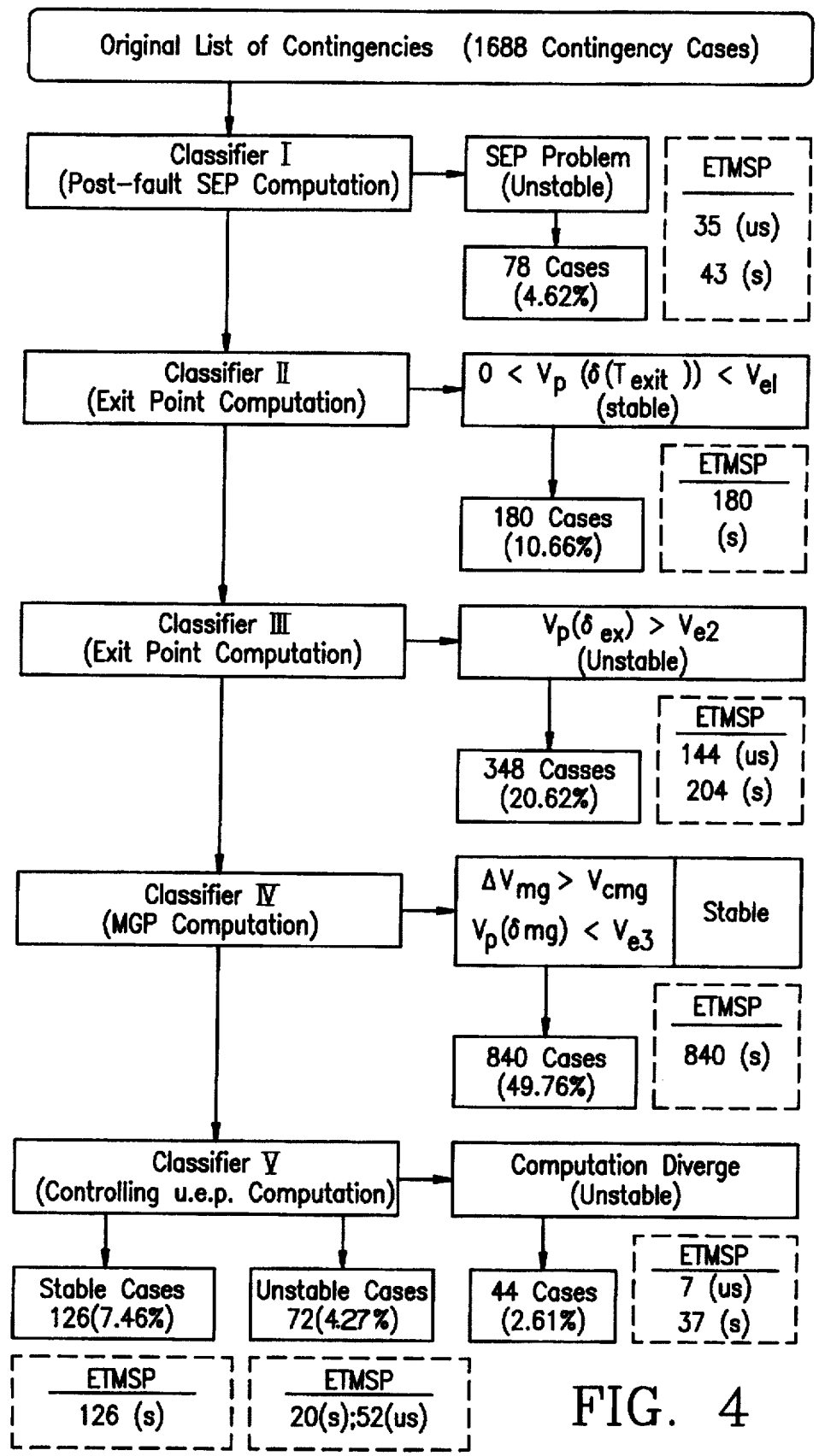
FIG. 4 is a block diagram graphically illustrating the results of a contingency screening experiment employing the BCU classifiers of the preferred embodiment of the present invention as applied to a first generator power system.

A total of 1688 contingencies was analyzed by the architecture of the present invention. The simulation results are summarized in FIG. 4. Of the 1688 contingencies, 1146 contingencies were classified to be stable and 542 to be unstable by the BCU classifiers. These 1146 stable contingencies were verified by the EPRI ETMSP to be indeed stable. Among the 542 cases which are classified to be unstable by the BCU classifiers, 238 are indeed unstable while 304 are instead stable according to ETMSP. Putting the above statistical number in a different way, 67.89% of the 1688 contingencies classified to be stable by the proposed BCU classifiers were indeed stable. Note that in practical applications, these contingencies require no further analysis from the time-domain simulation program 16. Among the 1688 contingencies, 32.11% would require the time domain simulation program 16 for verification. Only 18.0% of all contingencies have been under-estimated (i.e., stable case is classified to be unstable) by the BCU classifiers.

Figure 5:
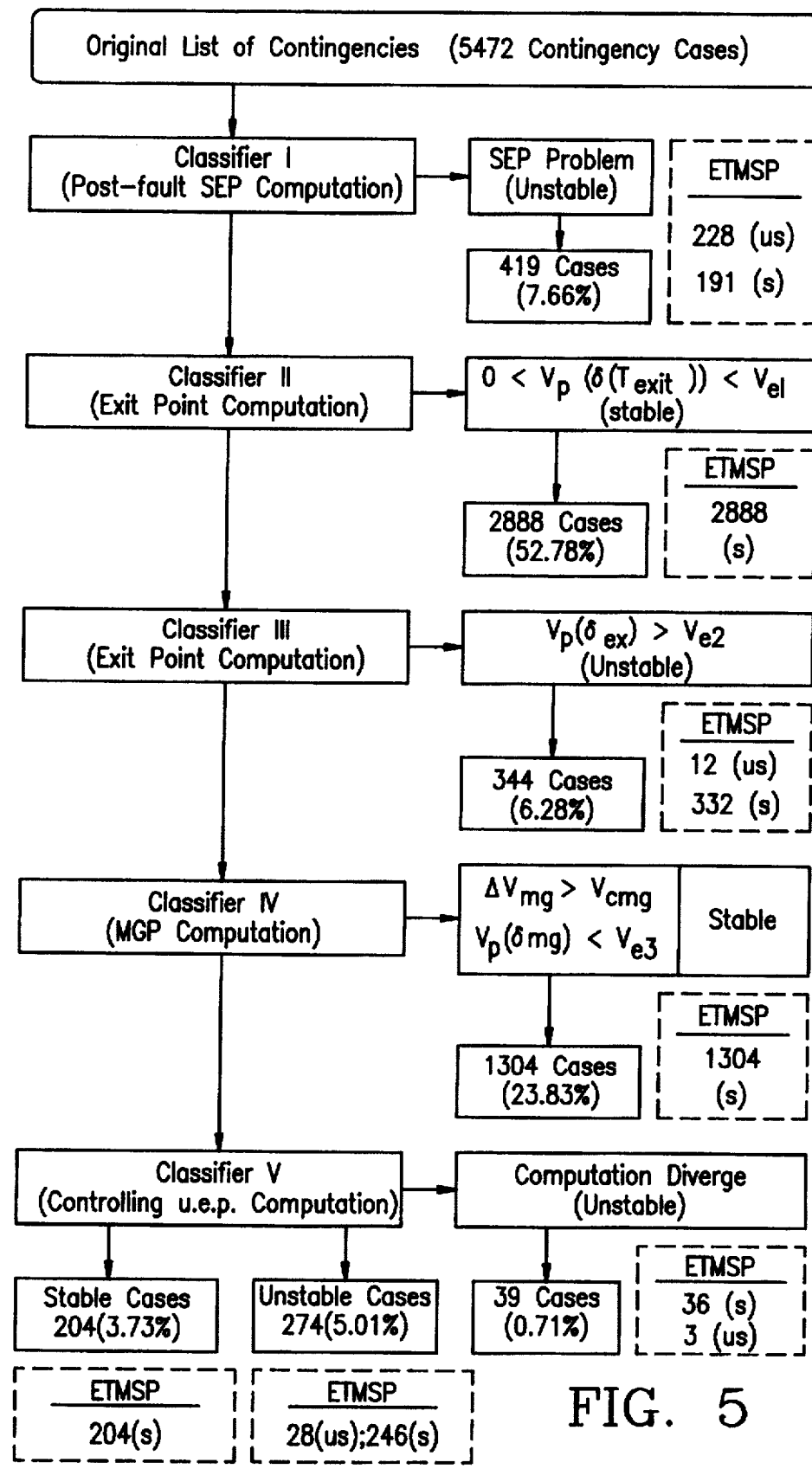
FIG. 5 is a block diagram graphically depicting the results of a contingency screening experiment employing the BCU classifiers of the preferred embodiment of the present invention as applied to a second generator power system.

For the 202-generator system, a total of 5472 contingencies have been assessed by the method of the present invention. The result of dynamic security assessments of the system is summarized in FIG. 5. Of the 5472 contingencies, 3684 were classified to be stable and 1788 to be unstable by the BCU classifiers. Again, these 3684 (i.e., 67.32%) stable contingencies were verified by the ETMSP to be indeed stable. It should be pointed out that the same threshold values for the five BCU classifiers were applied to both test systems. They are as follows:

The thresholds in Classifier I: $\delta_{smax}=90$; $I_{smax}=5$

The thresholds in Classifier II: $V_{e1}=3.0$; $T_{exit}=1.5$

The threshold in Classifier III: $V_{e2}=80$

The threshold in Classifier IV: $V_{e3}=80$; $V_{cmg}=1.0$

The threshold in Classifier V: $I_{umax}=10$

It is believed that some improvements of the overall dynamic security assessments could be achieved if fine tuned threshold values were used. Also, it can be seen from FIGS. 4 and 5 that a major portion of contingencies were screened out by BCU classifiers II, III and IV. Only 14.33% and 9.45% of total contingencies in the 50-generator and 202-generator system, respectively, were sent to the BCU classifier V for classification. This indicates that the proposed BCU classifiers are not only effective in screening out stable contingencies, but are also computationally effective in the screening process itself.

The experiments confirm that the method of the present invention employing the five BCU classifiers is highly effective in determining the majority of the contingencies to be stable, and not requiring any further analysis by the time-domain simulation program. Although in the two experiments, approximately one-third of the contingencies required analysis by the time-domain simulation program, the savings in computational time and effort are substantially greater than these numbers appear to indicate. This is because it takes substantially greater computational effort to analyze one of the stable contingencies that is screened out by the BCU classifiers, than it does to analyze the unstable contingencies. As a result, the contingency screening process of the present invention is capable of increasing the processing speed for dynamic security assessment of a power system by several hundred times or more over that of a conventional process in which each contingency is analyzed by the time-domain simulation program.

In summary, the present invention employs a sequence of BCU classifiers for dynamic contingency screening in a method for on-line dynamic security assessment. The designs of the BCU classifiers ensures that the requirements of both the computational speed and accuracy needed for on-line dynamic contingency screening are met by substantially reducing the computational efforts required of the time-domain simulation program. The effectiveness of the developed BCU classifiers and the proposed architecture was evaluated on two power systems with promising results. The numerical studies presented confirm the accuracy of the BCU classifiers; namely, a contingency is indeed (either first-swing or multi-swing) stable if it is classified by the BCU classifiers to be stable. It has been found that the threshold values of all indices in the BCU classifiers can be easily obtained by off-line calculations over a range of operating conditions, and that the performance of the five classifiers is not sensitive to the threshold selection.

Although the invention has been disclosed in terms of a preferred embodiment, it will be understood that numerous variations and modifications could be made thereto without departing from the scope of the invention as defined in the following claims.

What is claimed is:

1. A method for on-line dynamic contingency screening of an electric power system comprising the steps of:
   a) evaluating a plurality of contingencies, each said contingency comprising a postulated disturbance which said power system may experience, with a plurality of contingency classifiers based on the method of finding the controlling unstable equilibrium point of said power system known as the boundary of stability region based controlling unstable equilibrium point method, by sequentially applying said contingencies to a post-fault equilibrium point classifier, first and second exit point classifiers, a minimum gradient point classifier, and a controlling unstable equilibrium point classifier to form a first group of stable contingencies and a second group of unstable or undecided contingencies; and
   b) applying said second group of unstable or undecided contingencies to a time-domain simulation program to determine which of said second group of contingencies are in fact unstable.

2. The method of claim 1, wherein said step of applying said contingencies to a post-fault equilibrium point classifier further comprises:
   1) calculating the number of iteration in computing the post-fault stable equilibrium point for each said contingency;
   2) calculating the angle difference at the calculated stable equilibrium point for each said contingency;
   3) comparing the calculated number of iteration to a preselected maximum number of iteration and the calculated angle difference to a preselected maximum angle difference for each said contingency; and
   4) classifying as unstable any said contingencies whose calculated number of iteration exceeds said preselected maximum number of iteration, or said calculated angle difference exceeds said preselected maximum angle difference.

3. The method of claim 1, wherein said step of applying said contingencies to a first exit point classifier further comprises:
   1) determining if each said contingency has an exit point problem;
   2) for any said contingency that is determined to have an exit point problem, measuring the potential energy difference between the pre-fault equilibrium point and at the exit point; and
   3) classifying any contingency having an exit point problem as being stable if said potential energy difference is greater than zero but less than a threshold value.

4. The method of claim 1, wherein said step of applying said contingencies to a second exit point classifier further comprises:
   1) measuring the potential energy difference between the pre-fault state and the exit point for each said contingency; and
   2) classifying as being unstable any of said contingencies in which said potential energy difference is greater than a threshold value.

5. The method of claim 1, wherein said step of applying said contingencies to a minimum gradient point classifier further comprises:
   1) determining the potential energy difference between the pre-fault state and the minimum gradient point for each said contingency; and
   2) classifying as unstable any said contingencies in which said potential energy difference is greater than a preselected threshold value.

6. The method of claim 1, wherein said step of applying said contingencies to a controlling unstable equilibrium point classifier further comprises:
   1) determining for each said contingency, the maximum number of iteration required for computing the controlling unstable equilibrium point starting from the minimum gradient point;
   2) calculating the energy value for each said contingency at the fault clearing time and at the controlling unstable equilibrium point; and
   3) classifying as unstable any of said contingencies in which the number of iteration is greater than the preselected maximum, or the energy value at the fault clearing time is greater than the energy value at the controlling unstable equilibrium point.

7. The method of claim 1, wherein said step of evaluating a plurality of contingencies further comprises:
   1) calculating the number of iteration and computing the post-fault stable equilibrium point for each said contingency;
   2) calculating the angle difference at the calculated stable equilibrium point for each said contingency;

3) comparing the calculated number of iteration to a preselected maximum number of iteration and the calculated angle difference to a preselected maximum angle difference for each said contingency;

4) classifying as unstable any said contingencies whose calculated number of iteration exceeds said preselected maximum number of iteration, or said calculated angle difference exceeds said preselected maximum angle difference;

5) determining if any remaining unclassified contingencies has an exit point problem;

6) for any said contingency that is determined to have an exit point problem, measuring the potential energy difference between the pre-fault equilibrium point and at the exit point;

7) classifying any contingency having an exit point problem as being stable if said potential energy difference is greater than zero but less than a threshold value;

8) measuring the potential energy difference between the pre-fault state and the exit point for each remaining unclassified contingency;

9) classifying as being unstable any of said remaining contingencies in which said potential energy difference is greater than a threshold value;

10) determining the potential energy difference between the pre-fault state and the minimum gradient point for each said contingency still remaining unclassified;

11) classifying as unstable any said contingencies in which said potential energy difference is greater than a preselected threshold value;

12) determining for each remaining unclassified contingency, the maximum number of iteration required for computing the controlling unstable equilibrium point starting from the minimum gradient point;

13) calculating the energy value for each said contingency at the fault clearing time and at the controlling unstable equilibrium point; and 14) classifying as unstable any of said remaining unclassified contingencies in which the number of iteration is greater than the preselected maximum, or the energy value at the fault clearing time is greater than the energy value at the controlling unstable equilibrium point.

8. A system for on-line dynamic screening of contingencies comprising postulated disturbances which an electric power system may experience, said system comprising:

a) a dynamic contingency screening program for evaluating a plurality of contingencies with a plurality of contingency classifiers based on the method of finding the controlling unstable equilibrium point of said power system known as the boundary of stability region based controlling unstable equilibrium point method by sequentially applying said contingencies to a post-fault equilibrium point classifier, first and second exit point classifiers, minimum gradient point classifier, and a controlling unstable equilibrium point classifier to form a first group of stable contingencies and a second group of unstable or undecided contingencies; and b) a time-domain simulation program for determining which of said second group of contingencies are unstable.

9. The system of claim 8, wherein said post-fault equilibrium point classifier further comprises:

1) means for calculating the number of iteration in computing the post-fault stable equilibrium point for each said contingency;

2) means for calculating the angle difference at the calculated stable equilibrium point for each said contingency;

3) means for comparing the calculated number of iteration to a preselected maximum number of iteration and the calculated angle difference to a preselected maximum angle difference for each said contingency; and 4) means for classifying as unstable any said contigencies whose calculated number of iteration exceeds said preselected maximum number of iteration, or said calculated angle difference exceeds said preselected maximum angle difference.

10. The system of claim 8, wherein said first exit point classifier further comprises:

1) means for determining if each said contingency has an exit point problem;

2) means for measuring the potential energy difference between the pre-fault equilibrium point and at the exit point for any said contingency that is determined to have an exit point problem; and 3) means for classifying any contingency having an exit point problem as being stable if said potential energy difference is greater than zero but less than a threshold value.

11. The system of claim 8, wherein said second exit point classifier further comprises:

1) means for measuring the potential energy difference between the pre-fault state and the exit point for each said contingency; and 2) means for classifying as being unstable any of said contingencies in which said potential energy difference is greater than a threshold value.

12. The system of claim 8, wherein said minimum gradient point classifier further comprises:

1) means for determining the potential energy difference between the pre-fault state and the minimum gradient point for each said contingency; and 2) means for classifying as unstable any said contingencies in which said potential energy difference is greater than a preselected threshold value.

13. The system of claim 8, wherein said controlling unstable equilibrium point classifier further comprises:

1) means for determining for each said contingency, the maximum number of iteration required for computing the controlling unstable equilibrium point starting from the minimum gradient point;

2) means for calculating the energy value for each said contingency at the fault clearing time and at the controlling unstable equilibrium point; and 3) means for classifying as unstable any of said contingencies in which the number of iteration is greater than the preselected maximum, or the energy value at the fault clearing time is greater than the energy value at the controlling unstable equilibrium point.

14. The system of claim 8, wherein:

said post-fault equilibrium point classifier further comprises:

1) means for calculating the number of iteration in computing the post-fault stable equilibrium point for each said contingency;

2) means for calculating the angle difference at the calculated stable equilibrium point for each said contingency;

3) means for comparing the calculated number of iteration to a preselected maximum number of iteration and the calculated angle difference to a preselected maximum angle difference for each said contingency; and
4) means for classifying as unstable any said contingencies whose calculated number of iteration exceeds said preselected maximum number of iteration, or said calculated angle difference exceeds said preselected maximum angle difference;

said first exit point classifier further comprises:
1) means for determining if any remaining unclassified contingency has an exit point problem;
2) means for measuring the potential energy difference between the pre-fault equilibrium point and at the exit point for any said contingency that is determined to have an exit point problem; and
3) means for classifying any contingency having an exit point problem as being stable if said potential energy difference is greater than zero but less than a threshold value;

said second exit point classifier further comprises:
1) means for measuring the potential energy difference between the pre-fault state and the exit point for each remaining unclassified contingency; and
2) means for classifying as being unstable any of said contingencies in which said potential energy difference is greater than a threshold value;

said minimum gradient point classifier further comprises:
1) means for determining the potential energy difference between the pre-fault state and the minimum gradient point for each said remaining unclassified contingency; and
2) means for classifying as unstable any said remaining unclassified contingencies in which said potential energy difference is greater than a preselected threshold value; and said controlling unstable equilibrium point classifier further comprises:
1) means for determining for each said remaining unclassified contingency, the maximum number of iteration required for computing the controlling unstable equilibrium point starting from the minimum gradient point;
2) means for calculating the energy value for each said remaining unclassified contingency at the fault clearing time and at the controlling unstable equilibrium point; and
3) means for classifying as unstable any of said remaining unclassified contingencies in which the number of iteration is greater than the preselected maximum, or the energy value at the fault clearing time is greater than the energy value at the controlling unstable equilibrium point.

* * * * *